US010436667B2

(12) United States Patent
Littlestar et al.

(10) Patent No.: US 10,436,667 B2
(45) Date of Patent: *Oct. 8, 2019

(54) IN LINE INSPECTION METHOD AND APPARATUS FOR PERFORMING IN LINE INSPECTIONS

(71) Applicant: SMART PIPE COMPANY, INC., Houston, TX (US)

(72) Inventors: Gary Littlestar, Houston, TX (US); Chris Littlestar, Houston, TX (US)

(73) Assignee: SMART PIPE COMPANY, INC., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/362,221

(22) Filed: Mar. 22, 2019

(65) Prior Publication Data
US 2019/0219473 A1 Jul. 18, 2019

Related U.S. Application Data

(63) Continuation-in-part of application No. 15/714,760, filed on Sep. 25, 2017, now Pat. No. 10,288,207.

(51) Int. Cl.
*G01M 3/00* (2006.01)

(52) U.S. Cl.
CPC ................... *G01M 3/005* (2013.01)

(58) Field of Classification Search
CPC . F16L 55/26; F16L 55/46; F16L 55/48; E21B 47/12; G01N 2291/2636; G01S 13/758; G08B 13/2417; H01Q 1/2225
See application file for complete search history.

(56) References Cited

U.S. PATENT DOCUMENTS

| 4,199,834 | A  | * | 4/1980  | Muchow   | F16L 55/46  |
|           |    |   |         |          | 137/553     |
| 10,288,207| B2 | * | 5/2019  | Littlestar | F16L 55/1656 |
| 2002/0102373 | A1 | * | 8/2002 | DeMeyer  | F16L 9/12   |
|           |    |   |         |          | 428/36.2    |
| 2004/0211272 | A1 | * | 10/2004 | Aronstam | E21B 47/12  |
|           |    |   |         |          | 73/866.5    |

(Continued)

*Primary Examiner* — Firmin Backer
*Assistant Examiner* — Jerold B Murphy
(74) *Attorney, Agent, or Firm* — Juan J. Lizarraga

(57) ABSTRACT

An apparatus and method for performing inline inspections of pipelines of composite structure installed in a host pipeline or standing alone comprising a multiplicity of sensor/transducers located on or within the pipe structure to measure and record various pipeline properties, an activation/reading/storage device to activate read and collect measurement results from the sensor transducers, an automatic launch and recovery system for the activation/reading/storage device, and a database/storage/analytical device to receive, analyze and interpret results from collected data and transmit appropriate instructions to a pipeline operator or remotely activated system for action. The remote reading of sensor/transducers may be accomplished by a device running through the pipeline or passing over or near the pipeline, where ground-level handheld or wheeled vehicle mounted, fixed wing or rotary aircraft, hovercraft watercraft or satellite based instrumentation can record the location and condition of a pipeline.

20 Claims, 8 Drawing Sheets

(56) References Cited

U.S. PATENT DOCUMENTS

2009/0308475 A1* 12/2009 Stringfellow ......... B29C 63/343
           138/98
2013/0060487 A1* 3/2013 Papadimitriou ........ G10L 15/22
           702/34

* cited by examiner

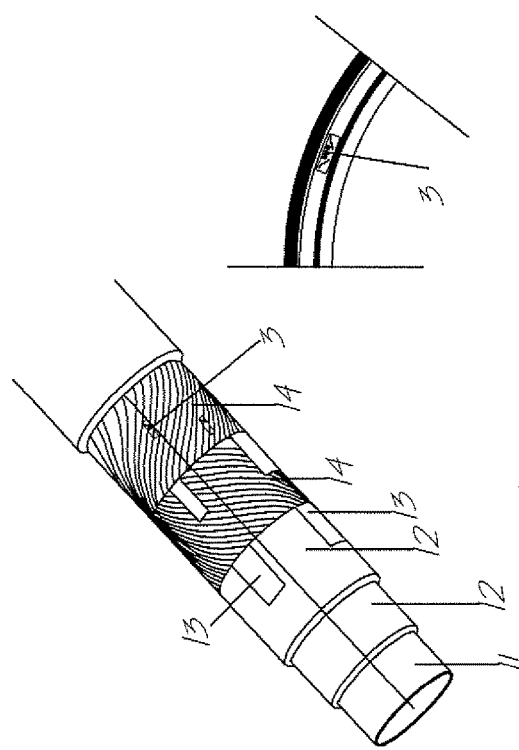
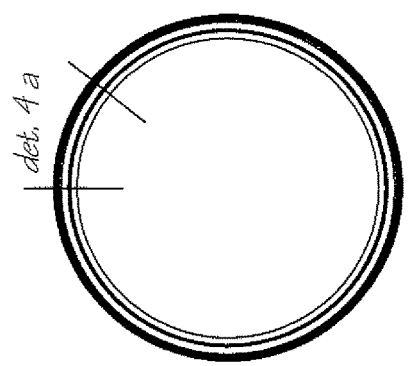
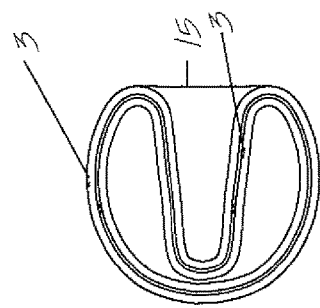
FIG. 4
FIG. 4 a
FIG. 5

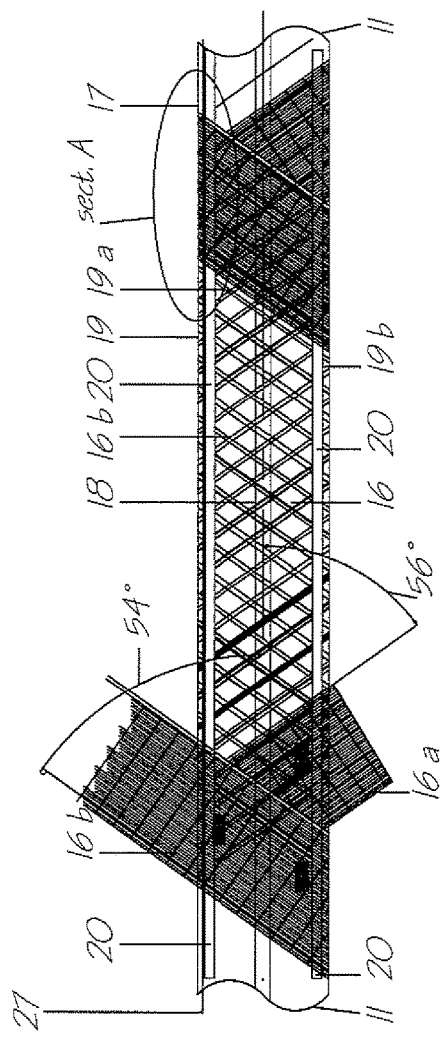
FIG.15
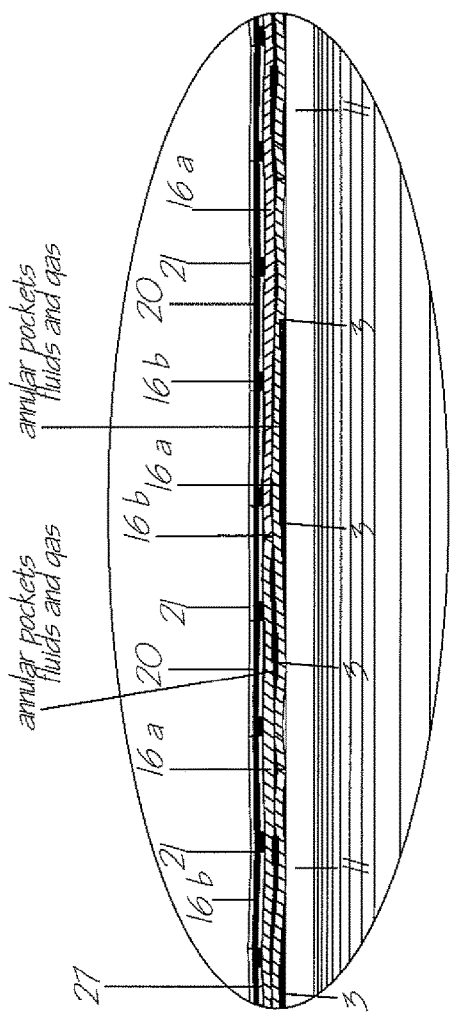
FIG.16 det. section A

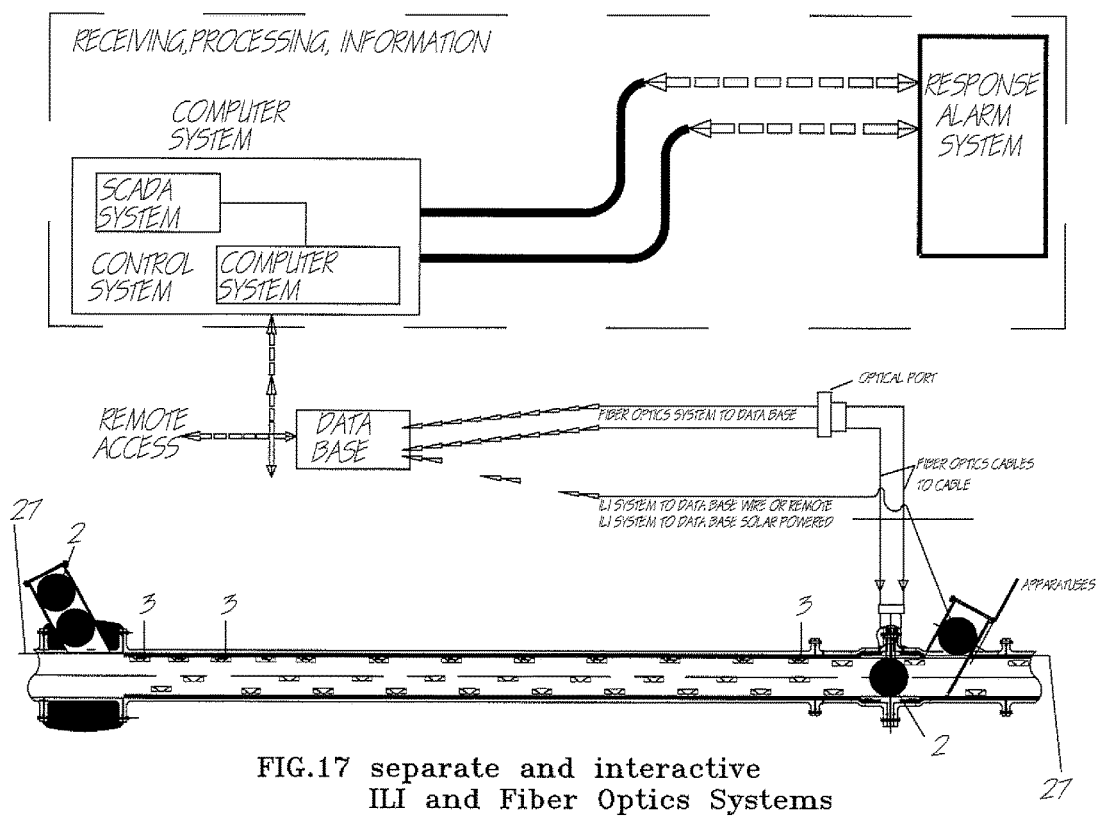
FIG.17 separate and interactive
ILI and Fiber Optics Systems

IN LINE INSPECTION METHOD AND APPARATUS FOR PERFORMING IN LINE INSPECTIONS

This application is a Continuation-in-part of application Ser. No. 15/714760 (the '760 application') filed Sep. 25, 2017, co-owned with the present invention. The '760 application is incorporated here by reference for all purposes, and with respect to all of which the present invention claims priority under United States Patent Law.

BACKGROUND

More than 2.6 million miles of regulated pipelines are in operation in the United States today. The Integrity of these steel pipelines is monitored periodically using Smart Pigs which travel through the internal diameter of these lines measuring wall thickness, dents and corrosion effects as they travel. This is an expensive but somewhat effective process for assessing the integrity of steel pipelines as required by state and federal regulations, and enforced by the Pipeline and Hazardous Materials Safety Administration (PHMSA). These same requirements will also apply to most, if not all, international regulatory bodies.

However, the use of pipes, conduits, pipelines or systems that are non-corrosive, non-metallic reinforced or partially metallic reinforced (referred to as composite pipes herein) in regulated pipelines has been increasing rapidly over the last several years. The techniques described above and used for integrity monitoring of steel pipelines, measurement of wall thickness and corrosion effects, are not effective on composite pipelines. Further, there are significant differences in the failure modes between steel pipelines and composite pipelines. Pipeline operators and regulators have long been seeking an effective method for assessing the integrity of composite pipelines.

This invention relates to novel apparatuses and methods that are single items, but can act as a system that provides an effective means for assessing composite pipeline integrity as desired by pipeline operators, state, federal and international regulatory agencies.

This novel invention comprises multiple parts, whereas the parts can function independently, but can form a system comprising; 1) Multiplicity of discreet sensors embedded into the composite pipeline, which measures and records a package of predetermined engineering data, 2) an internal reader/activator which can measure non sensor related data, or can excite sensors to collect, analyze and report the data from sensors, and 3) a multi-mode internal reader/activator and an automatic launch and retrieve system that may be operated manually, remotely, or automatically, based on data received and analyzed from any sensing or monitoring systems on the pipeline.

This novel invention includes a multi internal reader/activator and an automatic launch and retrieve system that is operated based on data received and analyzed from any sensing or monitoring systems on the pipeline or any control or monitoring systems from a remote location from which the pipeline is operated. This novel invention relates to any type of composite pipes, pipelines and conduits.

The present invention is particularly suited to the composite pipe manufactured by Smart Pipe Company Inc., with multilayered assembly with a core solid HDPE pipe with high strength, low weight helical reinforcement fabric layers and axial pull tapes to allow reduction in cross section shape such as "C-forming" and pulling composite pipe in extreme lengths of as much as 10 miles. For such extreme installations, the present invention is essential to monitoring stress, temperature, and leakage in the composite pipe and the host pipe.

SUMMARY OF THE INVENTION

This present invention is a novel sensor, and sensor data collection system for; collecting data, analyzing data, continuous or periodic measurements and/or testing, diagnostics, and ultimately assessing the integrity of composite pipelines, comprising of strategically placed remotely read sensor/transducers either live or with memory capacity, a remote activation/reading/storage (ARS) device and a database/storage/analytical (DSA) device including novel and proprietary software. The invention also includes a novel system to launch the ARS devices into the pipeline and retrieve the ARS devices from the pipeline, either automatically or manually.

The remotely read sensor/transducers envisioned can include, but are not limited to reading, collecting, and analyzing the following signals: acoustic, vibration, acceleration, strain or force, electrical current, electrical potential, magnetic, flow , fluid/gas velocity, density, ionizing radiation, subatomic particles, mechanical, chemical, optical, thermal, environmental, hydraulic, global positioning data (GPS), conductivity and inductivity.

The types of sensors/transducers envisioned can be, but are not limited to; piezoelectric crystals, piezoelectric ceramics, analog or digital pressure, vibration monitoring sensors, fluid pulse transducers/sensors, temperature, and strain transducers/sensors, radio frequency sensors, geophone, hydrophone, moisture sensors, electrochemical sensors, graphene sensors, nano material sensing systems, optical sensors, WISP (Wireless Identification and Sensing Platform) sensors, amplifiers and integrated circuit technologies and conductivity, and or inductivity sensing systems.

The devices listed can be used for, but are not limited to measuring predetermined engineering parameters such as; location and movement of pipeline position, temperature, humidity, stress, strain, elongation, dimension, circumferential measurement, ovality of the composite system, gas or fluid composition, flow velocity, presence of hydrates or chemical build up on the composite walls, annulus and pipe pressure, wall loss, chemical degradation, and material properties of the composite system.

The measuring, collecting, and analyzing engineering parameters required for assessing pipeline health and/or integrity is done with miniature transceivers, and/or sensors/transducers, having storage capacity, transmitting and receiving ability and that are built into or attached anywhere on or within the construction of the composite pipe body and can be activated and powered by signals from the ARS device and, when activated, read engineering parameters useful in establishing the integrity of the pipeline transmitting those readings back to the ARS device. Location of the miniature transceivers and/or sensor/transducers circumferentially, axially, and or built into the composite structure along the pipeline is determined by engineering requirements.

Analytically, these parameters establish the location of the pipeline and any subsequent changes in location, diameter stress, strain in the pipe wall at a given position in the pipeline, ovality of the pipe as a function of given position in the pipeline, the general configuration of the pipeline, and any other required engineering parameters, and presence of any leaks and potential for short term and/or long term pipe system failure.

The ARS device may be comprised of, but not limited to, a power source, an integrated circuit with antenna, transceiver, laser, camera, optical devices, robotic arms, treads, wheels, gearing or hydraulic and/or mechanical rotating systems, tethering devices, fluid and/or gas driven venting systems, propellers, propulsive nozzles, wings, fins or legs, and data storage (memory) section. This device is passed through, over or near the pipeline sending signals with sufficient power to activate the sensor/transducers and allow them to measure engineering parameters and transmit the measurement results back to the ARS device which receives and stores them as a function of time, or in relation to a discreet position along the pipeline and can also take interior measurements, photo and video images and collects samples of gas, fluid and/or any solids present. The ARS device may have connectivity provided by metallic or non-metallic wires that are integral to the reinforcement or are separately installed within the pipe wall to provide connectivity. Likewise, the ARS device may have the power source and/or connectivity provided by proximity to a metallic host pipe having electrical properties resultant from an operating Cathodic Protection system.

The ARS device may be configured as a robotic device, or sphere, or ball, or elongated bullet, or of a funnel or closed funnel geometry, or a tethered apparatus or by a self-contained propulsion system, for passage through the inside diameter of the pipeline, or as a vehicle mounted device for passing over or near the pipeline. "Vehicle" in this document indicates a hand held device, a device mounted on a hand pushed cart rolling on the surface of the ground or a powered vehicle such as a hovercraft, wheeled vehicle, tracked vehicle, helicopter or airplane or glider, or "lighter-than-air" aircraft, or satellites. The size, frequency and output of the power source and transceiver will vary depending upon the configuration of the sensor/transducers and ARS device and its expected proximity to the pipeline.

The ARS memory may be in the form of any electronic data storage device or combination of such devices with sufficient capacity for the anticipated amount of data expected to be accumulated over the length of pipeline to be examined. The predetermined engineering parameters or data to be collected by the various sensors/transducers may include, but not be limited to; location and movement of pipeline position, location of the sensor relative to the pipeline, temperature, humidity, stress, strain, elongation and ovality of the composite system, gas or fluid composition, flow velocity, presence of hydrates or chemical build up on the composite walls, annulus and pipe pressure, wall loss, chemical degradation, material properties of the composite system, and the engineering parameter(s) read.

The automatic launch and recovery system (ALRS) for the ARS consists of two or more discreet locations along the pipeline as determined by engineering, where an ALRS launcher and an ALRS receiver are installed. The ALRS contains a wired or wireless charging system, wired, wireless and/or fiber optic system for downloading and transmitting data from the ARS device.

The ALRS launcher comprises a chamber that may hold multiple ARS units and will be sealed so that the ARS units can be launched into the system without having to open the pipeline system. The ALRS launcher comprises a fill chamber operated by a pneumatic, or hydraulic, or electrical valve. The ARS unit to be launched is dropped by gravity into the launch chamber after opening the uppermost valve (Launch chamber valve), which is then closed. A lower valve (stream chamber valve) is then opened to equalize the launch chamber to pipeline flow pressure. Once the launch chamber is equalized, the ARS is pushed into the pipeline stream by a nitrogen or fluid charge that creates a pressure differential across the ARS pushing it into the pipeline stream. As the ARS passes from the launch chamber into the pipeline a mechanical or electronic switch is triggered by the ARS, which automatically closes the stream chamber valve. The stream chamber valve is then bled down to 0 psi. This is a full cycle and the launching of a second or subsequent ARS would be a repeat of the cycle.

The ALRS receiver comprises a chamber that will hold multiple ARS units and will be sealed so that the ARS units can be retrieved from the system. The ALRS receiver comprises a receiving chamber and a recovery chamber operated by pneumatic, or hydraulic, or electrical valves. During the running of and prior to the receiving of the ARS, the lower most valve, furthest from the pipeline flow, (recovery chamber valve) is in a closed position. The upper most valve, furthest from the pipeline flow, (retrieval chamber valve) is opened and the pressure is equal to the pipeline stream.

Upstream of the retrieval chamber is a mechanical or electronic switch in the pipeline which is triggered by the passing of the ARS. When the switch is triggered, a separate pneumatic, or hydraulic, or electrical valve (pressure differential valve) on the outside of the retrieval chamber is opened to a vessel or to atmosphere that enables a sufficient flow volume to maintain a lower pressure (minimum differential pressure of 1 psi) in the recovery chamber for a sufficient time to enable the ARS to flow into the retrieval chamber. As the ARS passes into the retrieval chamber it triggers another mechanical or electrical switch that closes the retrieval chamber valve and then the pressure differential valve, isolating the retrieval chamber from the pipeline flow. The recovery chamber valve is then opened, and the pressure differential valve is opened to push the ARS into the recovery chamber. A flapper in the recovery chamber closes after the ARS passes through and the differential pressure valve closes. The vessel for differential pressure is reduced to 0 pressure and, if required, drained of any fluids in preparation for the next ARS retrieval.

The above systems can also be operated manually.

The database/storage/analytical (DSA) device is a portable or fixed computer based system with novel system specific software. The DSA receives data from the ARS unit through wireless or cable connectivity means, stores in an accumulated data base, and processes the data. Processing the data involves the use of the novel software to calculate desired engineering values that are used to establish the integrity of the pipeline and identify any changes and/or anomalies from the baseline or previous inspection. All of these actions are part of the machine-learning aspect of the system, which will access and interface with the sensors and launcher/receiver apparatus. The DSA shall receive, store and process data including the presence of hydrates or chemical build up on the composite walls, annular spaces and pipe pressure read and collected from the sensor/transducers embedded in the reinforcement layers, or the protective covering of the composite pipe structure by the reader/activator unit, and be capable of reading and transmitting the collected data to the system operator, either by fiber optic cable or wired, wireless or satellite based communication systems powered by solar panels and batteries.

Comparison of the calculated values with prior values indicate any change in the pipeline parameters, such as, but not limited to; pipeline operating temperature and humidity, change in ovality and increases in hoop and/or axial strain and elongation of the pipe. These are compared against pre-determined limits to establish pipeline integrity.

NOVELTY OF THE INVENTION

Prior art for steel pipeline integrity inspection has been based upon the primary mode of failure of metallic pipes. That is, measurement of the effects of corrosion/erosion resulting in a loss of wall thickness and providing information necessary to:

Establish the need for pipeline replacement,
Establish the need for a reduction in functionality of the pipeline
Demonstrate the integrity of the pipeline The present invention provides a novel non-intrusive, non-destructive method and apparatus for obtaining the data necessary to identify near term failure modes, predict longer term failure modes of composite pipelines and to identify other anomalies leading to premature failure of the pipeline. The collected data provides objective information which allows assessment of the integrity of the pipeline considering time dependent failures which can be used to address the needs of the pipeline operator and regulatory bodies such as PHMSA and/or any other regulatory bodies.

The present invention allows for the configuration of the apparatus such that the sensor/transducers are passive, power assisted passive, semi passive, active or in combinations of such configurations. The sensor/transducers can be located within the pipe structure such that they are protected from most external events and are designed to operate at any pre-designated period of time, and can be designed to operate for at least 50-years without maintenance.

The novel sensor/transducers are designed to detect and measure, for example, bi-axial strain (strain in two perpendicular directions), temperature, humidity, chemical composition and provide the pipeline's identification and location of the sensor/transducer with respect to the pipeline. Other specialty sensor/transducers may be used for specific measurements/applications. Each sensor/transducer may have a memory storage capability and a transceiver/antenna built-in to allow receiving activation signals from the ARS unit and transmitting the results of measurements back to the ARS. Strain, and especially changes in strain over time, are key data for assessing the pipes integrity. Sensor/transducers operate independently of each other such that a failure of one does not affect the working of adjacent sensor/transducers.

In one novel configuration the ARS unit is designed to be launched into the pipeline and self-propelled, carried by flowing fluid and/or gas, or pulled through the pipeline via tether, or magnetics, or robotics engaging the sensor/transducers as it passes. In this configuration, the ARS contains an internal power source, a transceiver/antenna and memory or storage section and device for direct downloading of collected data. The power source can be a battery, or any other source of power suitable for the intended purpose. The ARS transceiver/antenna is designed to operate in the same frequency range as the sensor/transducers or other contactless, wireless, near field communication with the sensor. The memory/storage section contains adequate capacity to store the data over the length of pipeline to be inspected, and also based on time parameters where the storage can hold sufficient data for analysis against previous measurements.

In another novel configuration the ARS unit described is handheld, mounted on a hand pushed cart and pushed along the ground over the pipeline reading the sensor/transducers as it moves past them or mounted in or is mounted on a powered vehicle such as but not limited to a wheeled vehicle, a tracked vehicle, a hovercraft, a water vehicle, a flying vehicle such as but not limited to a helicopter or fixed wing airplane, or "lighter-than-air vehicle, or satellite. In this configuration an external source of power may be provided. Additionally, selected discreet segments of the line or "spot checks" can be made by external ARS unit.

The novel DSA apparatus is a computer based system that includes connectivity to the ARS and may also send information directly to the operator's pipeline Supervisory Control And Data Acquisition (SCADA) system. The DSA may be mobile or fixed. The mobile configuration may be mounted on the push cart or other vehicles as described above. In both configurations the DSA is controlled by innovative specialty software that processes the recorded data, analyzes it using specific for purpose software and compares the results with prior results and against pre-determined values. When values are outside allowable limits a warning may be transmitted to the pipeline operator's SCADA or any other control system and when warranted, pipeline control devices may be activated, either by SCADA or any other control system or by the ARS systems.

The novel ARS apparatus can also be a computer based system that includes connectivity to the sensors/transducers as well as send information directly to the operator's pipeline Supervisory Control And Data Acquisition (SCADA) system or any other control system. In this configuration ARS is controlled by innovative specialty software that processes the recorded data, analyzes it using specific for purpose software and compares the results with prior results and against pre-determined values. When values are outside allowable limits a warning may be transmitted to the pipeline operator's SCADA system or any other control system and when warranted, pipeline control devices may be activated, either by SCADA system or any other control system, or by the ARS apparatus itself.

The novel automatic launch and recovery system (ALRS) can be controlled with the pipeline operator SCADA system or any other control system, and also can be controlled by the ARS apparatus itself when it is operated as a separate computer mode.

BRIEF DESCRIPTION OF THE DRAWINGS

FIG. 4 is an isometric depiction of a composite pipe structure where the components of the pipe materials have built in sensor/transducers and the sensor/transducers are independently attached or those which can be applied and built within the material itself. There are also nano sensor/transducers, WISP Sensors and graphene sensors included as part of the materials of construction. The nano enhanced coating, adhesive and filler materials are also included. Such systems have a high strength and resilience that can sustain high pressures, temperatures and impacts.

FIG. 4a shows a segment of a fully expanded cross section of the composite pipe with an inserted sensor/transducer.

FIG. 5 is a reduced "C" shape alongside a fully expanded shape, among other shapes for the reduction of the composite pipe used as a structural form for easy insertion into an existing pipeline, showing the covers as a protection and also available as mentioned in FIG. 4.

FIGS. 11, 11A, 11B, and 11C are isometric, plan, front and side views of a helical wrapping machine similar to that depicted in FIG. 7.

FIG. 15 shows another side view of the components of the composite pipe of FIG. 4. with a representation of fiber optics.

FIG. 16 shows a cross section of the composite pipe shown in FIG. 15 showing annular pockets of fluids and gas that develop within and between the reinforcement fabric layers and between the core pipe and reinforcement fabric layers.

FIG. 17 is a schematic showing the correlation between the fiber optic systems and the inventive system.

DETAILED DESCRIPTION OF THE INVENTION

Figure 1:
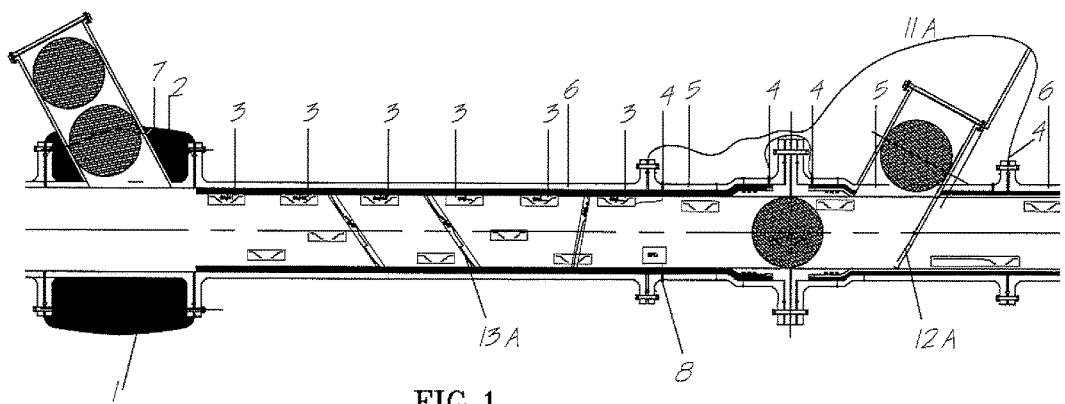
FIG. 1 is the cross sectional presentation of a composite pipeline within a host pipeline, shown with the sensors in different positions and under the variety of angles, within the composite pipeline; showing launching and receiving stations.

FIG. 1 shows a cross sectional presentation of a typical pipeline with the inventive system and method for monitoring pipelines installed along with novel automatic launch and recovery system (ALRS) for an activation/reading/storage device (ARS). In FIG. 1, a host pipeline 6 is fitted with a launching fitting 1 having an ARS launcher 2, an adapter spool piece 5 with a protective enclosure 7, an ALRS receiver 11A, and a retractable gate 12A. Also shown are sensor/transducers 3 in various positions 13A. A wired sensor 4 is shown as well as a radio frequency identifier RFID 8.

It is intended that the inventive system and method be applicable to a length of pipeline with an existing technology pig retrieval fitting adapted for use with composite piping and ARS unit at the opposite end of the pipeline.

It is also intended that the inventive system and method be applicable on re-habilitation projects for a host metallic pipeline and for pipes, conduits, pipelines or systems that are non-corrosive, non-metallic reinforced or are partially metallic reinforced that are either inserted into a steel "host pipe" or deployed as a stand-alone composite pipe.

The sensor/transducers 3 are positioned axially and circumferentially, or manufactured in-situ within the non-metallic or partially metallic reinforced theunoplastic composite pipe wall layers in strategic locations where:

The sensor/transducers 3 are passive—there is no local power.

The sensor/transducers 3 are semi-active modified radio frequency identifier devices that have limited local power such as a battery or power generator.

The sensor/transducers 3 are powered or active—that is with full local power or hardwired into the system.

Figure 2:
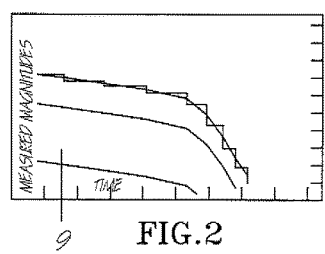
FIG. 2 is a depiction of the recorded data in one folia of the presentation by the ARS or DSA reading instrumentation.

FIG. 2 depicts a graphical reading 9 or electronic presentation from the ARS or DAS instrumentation.

Figure 3:
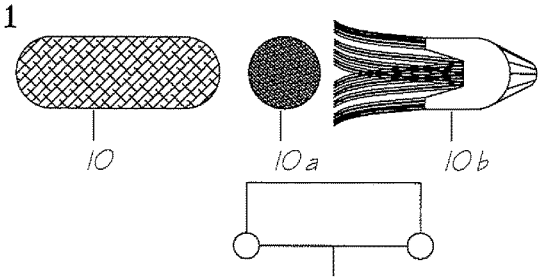
FIG. 3 depicts non-dimensional sketches of the ARS "data retrieval pod" and "data retrieval ball" and data retrieval "pig" or "squid", self propelled reader, implying the variety of sizes and shapes that are possible.

FIG. 3 shows two possible cross sections of ARS Units, including the "data retrieval pod" 10, the "data retrieval ball" ARS unit 10a and a data retrieval pig or squid 10b, self propelled reader 10c.

In FIG. 4 an isometric representation of one type of high strength light weight composite pipe 17 in one form of manufacturing is depicted with a pressure barrier core pipe 11, reinforcement fabric strength layers 12 helical and circularly wound as per the design requirements for strength with sensor/transducers 3 embedded within the fabric as required, high strength axial pulling tapes 13 with imbedded sensors as required, and fiber tows 14 with embedded sensors. The fibers used in both the fabric strength layers 12 and the axial pulling tapes 13 are high strength liquid crystal polyester (VECTRAN®) and aramid (TWARON® and TECHNORA®). These fibers have tensile strengths in excess of 400 ksi, and an elastic modulus about 40% of steel. These fibers have a density of about 1.4 times that of water compared to 7.85 times for steel.

FIG. 5 shows a cross section formed in one possible shape for reduction of the pipe diameter with sensor/transducers 3 embedded under a protective covering 15 required for some installations in a host pipe. Alongside the formed shape is shown a fully expanded shape from which a section is marked and depicted in FIG. 4a to show the placement/insertion of a sensor/transducer 3 in the composite wall structure.

Figure 6:
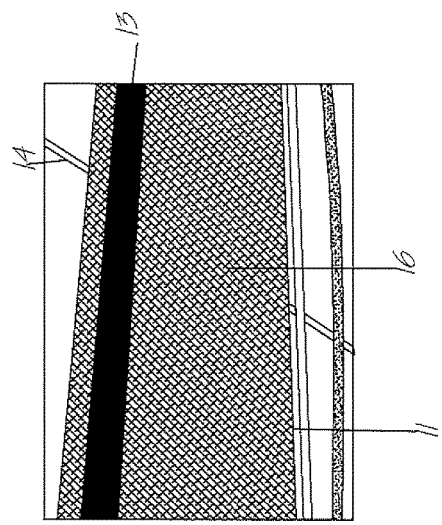
FIG. 6 shows the detail of the installed pulling tapes and the fabric composition with built in components for sensors and material built in sensors such as nano fibers and graphene materials.

FIG. 6 shows the detail of the high strength pulling tapes 13 and the reinforcing fabric 16 woven with nano fibers as sensors as a part of the fabric composition capable of functioning within the structural fabric. Other types of sensors can include; piezoelectric sensors, transducers, radio frequency sensors, graphene sensors, nano material sensing systems, WISP sensors, optical sensors and conductivity sensing.

Figure 7:
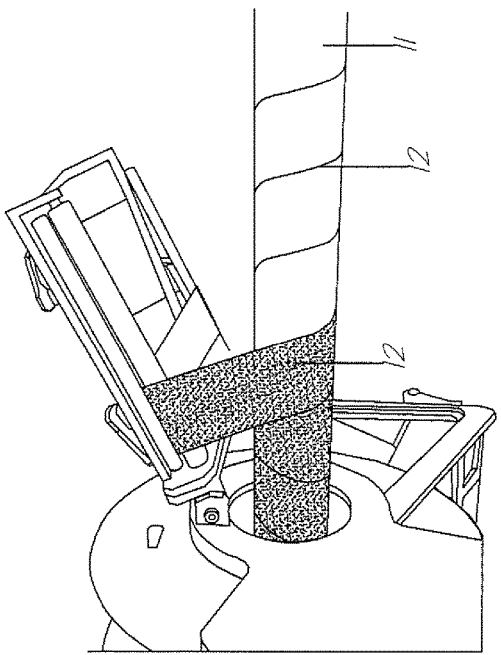
FIG. 7 is the detail of the machine showing the patented application by helical means of the tapes as overlays over a core pipe as a shape and size control member of the composite pipe.

In FIG. 7 the machine used for one method of pipe construction is shown applying the reinforcement fabric layers 12 on the pressure barrier core pipe 11. In one embodiment the core pipe 11 is extruded HDPE in any suitable grade such as PE 4710 or PE100. In certain aspects, a fluid resistant thermoplastic material is used for the core pipe 11 that resists fluids being transported through a pipeline. Among the materials that may be used are NYLON 6 ®, RILSON®, or NYLON 11® or other suitable thermoplastic material. In certain embodiments, lengths of the core pipe 11 are welded together at a location at which the composite pipe 17 is to be installed.

Figure 8:
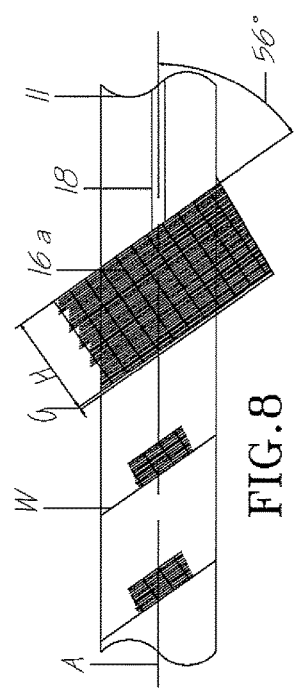
FIGS. 8, 9 and 10 are side views of the components of the composite pipe of FIG. 4.
Figure 9:
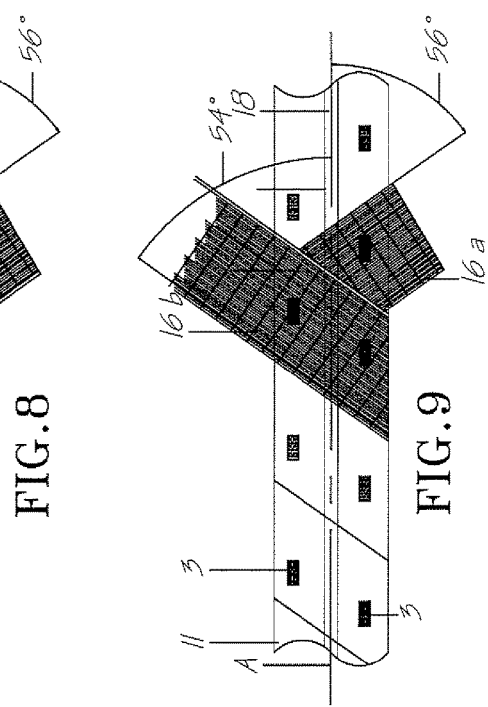
Figure 10:
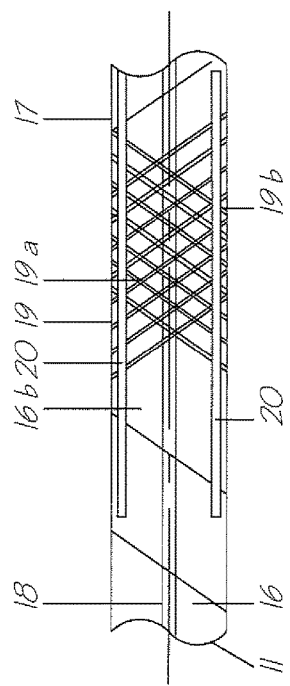
Figure 11A:
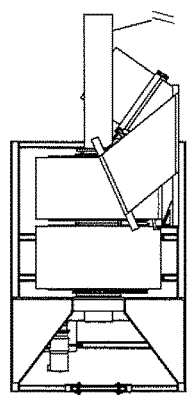
Figure 11C:
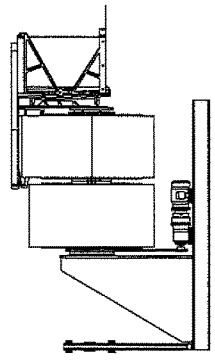
Figure 11B:
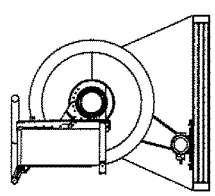

In FIGS. 8, 9 and 10 are side views of the components of a composite pipe structure 17 during manufacture.

In FIG. 8, the first layer 16a of reinforcing fabric 16 is wrapped around the pressure barrier core pipe 11. Suitable materials for this fabric 16 include fabric with highly oriented high molecular weight polyethylene ("HMPE"); or ultra high molecular weight polyethylene ("UHMPE"); such as KEVLAR®; ARAMID®; VECTRAN®; liquid crystal polymer ("LCP"); DYNEEMA®; TWARON®; TECH-NORA®; fiber-reinforcing material, e.g. carbon fibers, fiberglass fibers and/or hybrid fibers; fabric made from carbon fibers and/or glass fibers; and fabric made from carbon fibers and SPECTRA®. The thickness of first layer 16a and 16b as shown in FIG. 9 may typically range between 0.010 and 0.240 inches.

The first layer 16a is wrapped around the pressure barrier core pipe 11 at a wrap angle between 45 degrees and 85 degrees. In FIG. 8, the wind angle is shown as 56 degrees with respect to the longitudinal axis A of the pressure barrier core pipe 11. Edges of each wrap are butted up against edges of adjacent wraps so no part of the first layer 16a overlaps itself. The butting is indicated by W. Alternatively, a minimal overlap is used or there is a gap G. Each wrap of first layer 16a has a width H. Optionally, one or more tapes 18, strips, or lines of adhesive or glue are applied on the pressure barrier core pipe 11.

As shown in FIG. 9, a second layer 16b is wrapped over the first layer 16a and may be wrapped in any of the number of ways described for the first layer 16a and may be of the material described for the first layer 16a. Also shown are sensor/transducers 3.

As shown in FIG. 10, up to forty or more fiber strands 19 or "tows" are wound on the second layer 16b, or on the first layer 16a, or on the tapes 18 to strengthen the composite pipe structure 17 and facilitate its integrity while it is being pulled through a pipeline. Strands 19a are at a positive wind angle to the longitudinal axis A and strands 19b are at a negative wind angle. Fiber optic cables 20 are also shown.

This composite pipe structure 17 with a pressure barrier core pipe 11 with high strength, low weight helical reinforcement fabric layers 16a and 16b, and axial pull tapes 13 must be flexible and strong enough to allow reduction in cross section shape such as "C-forming", pulling of the composite pipe structure 17 in extreme continuous lengths of as much as 10 miles, and then restoring the composite pipe structure 17 to a round shape installed in a host pipeline. These extreme specifications require the implementation of the present invention for proper health and structural monitoring.

FIGS. 11, 11A, 11B, and 11C, respectively show isometric, plan, front and side views of a helical wrapping machine similar to that depicted in FIG. 7 with a pressure barrier core pipe 11 being fed continuously through the wrapping machine.

Figure 12A:
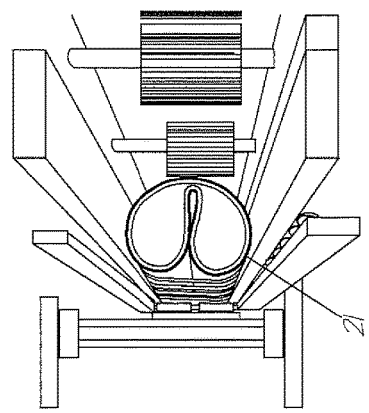
FIG. 12A is an end view of the shape reduction machine showing the composite pipe exiting the machine with a reduced cross sectional shape.
Figure 12:
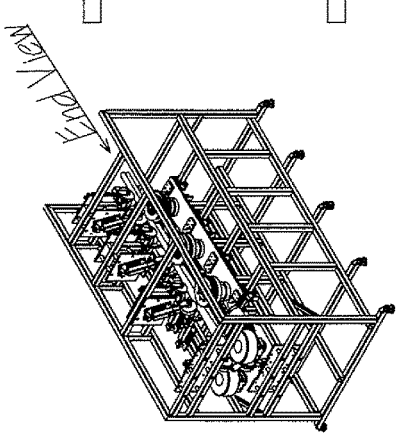
FIG. 12 is a shape reduction machine for reducing the cross sectional shape of the composite pipe from round to a "C" shape.

FIG. 12 shows a shape reduction machine for reducing the cross sectional shape of the composite pipe structure 17 from round to a "C" shape as traveling through a series of rollers and mandrels from left to right. As the composite pipe structure 17 is reduced in cross sectional shape from round to a "C" shape a protective coating 15 is installed to protect and hold the "C" shape. FIG. 12A shows the end view of the composite pipe structure 17 in reduced "C" cross sectional shape 21 with protective coating 15 exiting the shape reduction machine. A "C" shape is depicted but other shapes are possible.

As noted above the composite pipe structure 17 is reduced in cross sectional shape from round to a "C" shape to facilitate installation in a host pipe by pulling the reduced composite pipe structure 21 through the host pipe.

Figure 13:
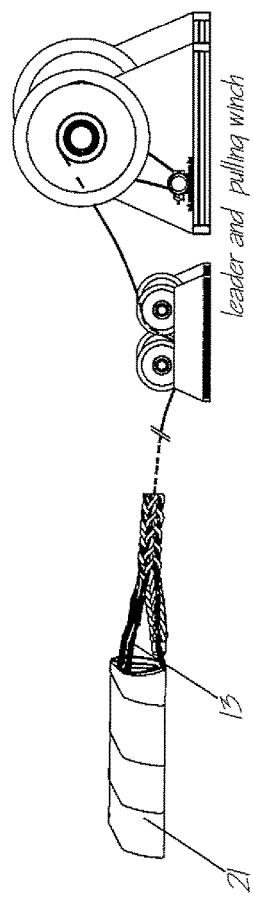
FIG. 13 shows the tow head or pulling end of the composite pipe with a reduced cross sectional shape wrapped in a protective coating with high strength pulling tapes spliced into a tow line being pulled through a leader by a pulling winch.

FIG. 13 shows the tow head or pulling end 23 of the composite pipe with a reduced cross sectional shape 21 wrapped in a protective coating 15 with high strength pulling tapes 13 spliced into a tow line 22 being pulled through a leader 24 by a pulling winch 25.

Figure 14:
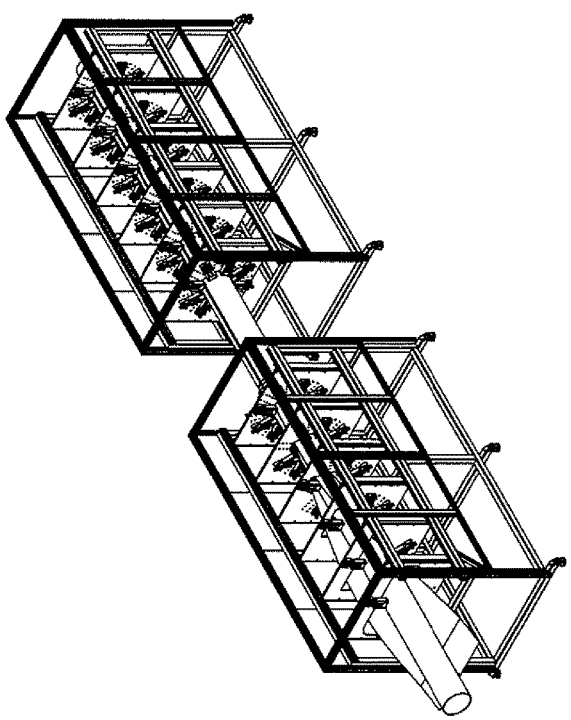
FIG. 14 shows a wrapping machine applying a continuous longitudinal wrap on the composite pipe.

FIG. 14 shows a wrapping machine 26 applying a continuous longitudinal wrap on the composite pipe structure 17 before reduction in cross sectional shape.

FIG. 15 shows another side view of the components of the composite pipe structure 17 of FIG. 4. with a representation of fiber optics 27. Section A as depicted in FIG. 16 shows a cross section of the composite pipe structure 17 shown in FIG. 15 showing annular pockets of fluids and gas that develop within and between the reinforcement fabric layers 16a and 16b and between the core pipe 11 and reinforcement fabric layers 16a and 16b. The distinct difference between the present invention and prior art lies in its advance beyond fiber optics systems known in prior art. A fiber optics system responds only as stated to the measurements of stress, strain, temperature as it could be attributed to the function of the reinforced composite pipe. Annuli are formed within and between the layers of the reinforcing fabric and these pockets are accumulating gases, water, and contaminated liquids and permeated liquids from the transported fluids in the pipe and from the external matter surrounding the composite pipe structure 17. This contamination can cause the reinforcing fibers to lose strength, and the layers to separate and weaken, ultimately causing premature failure of the composite pipe structure 17. A fiber optics system can relate data after the fact of bulging, creeping, bending, temperature changes, etc., but not the presence of hydrates or chemical build up on the composite walls and annular spaces, that fundamentally do not change the geometry of the reinforced composite pipe 17, but are a "silent" factor in damaging the composite pipe structure 17 while undetected. The present inventive system is a responsive system to detect and inform the operator of the presence of hydrates or chemical build up or foreign materials.

In FIG. 17, a schematic showing the correlation between the fiber optic systems 27 and the inventive system, the correlation between the fiber optic systems and the inventive system is illustrated. As can be seen, the ARS launcher 2 can systematically release and retrieve ARS data retrieval balls, pods, pigs, squids, FIG. 3 through the pipeline to continuously monitor for, among other things, annular pockets of fluids and gas that develop between the reinforcement fabric layers 16a and 16b by passing the sensor/transducers 3. This is in addition to any data retrievable from the fiber optic system. Also shown is a fundamental block diagram for receiving and processing information.

What is claimed is:

1. An inline inspection system to assess the integrity of non-corrosive, non-metallic reinforced or partially metallic reinforced composite pipe—installed in a host pipeline or standing alone comprising:

a. a composite pipe structure further comprising:
   a pressure barrier core pipe with a wall;
   reinforcement layers helically wrapped externally around the core pipe, and protective covering with a multiplicity of sensor/transducers embedded in the reinforcement layers, to measure and record data;

b. a reader/activator unit, which may be an activator or reader or combination activator/reader, internal to the composite pipe structure to activate, read and collect data including the presence of hydrates or chemical build up on the composite walls, annular spaces and pipe pressure from the sensor/transducers embedded in the reinforcement layers or the protective covering of the composite pipe;

c. an inline launch and recovery system in the composite pipe structure for launch and retrieval of the reader/activator unit internal to the composite pipe without having to open the composite pipe; and d. as part of the inline launch and recovery system, a database/storage/analytical computer based system to receive, store and process data including the presence of hydrates or chemical build up on the composite walls, annular spaces and pipe pressure read and collected from the sensor/transducers embedded in the reinforcement layers, or the protective covering of the composite pipe structure by the reader/activator unit, capable of reading and transmitting the collected data to the system operator, either by fiber optic cable or wired, wireless or satellite based communication systems.

2. The system of claim 1 wherein the sensor/transducers comprise wired sensors, non-wired sensors, networked sensors, sensors without connectivity to a power source, sensors with connectivity to a power source, radio frequency operated sensors, nano-technology based sensors, wireless identification and sensing platform sensors, optical sensors, or graphene sensors.

3. The system of claim 1 wherein the data measured and recorded by the sensors/transducers comprises: acoustic, vibration, acceleration, strain or force, electrical current, electrical potential, magnetic, flow, fluid/gas velocity, density, ionizing radiation, subatomic particles, mechanical, chemical, optical, thermal, environmental, hydraulic, global positioning data (GPS), conductivity or inductivity.

4. The system of claim 1 wherein the sensors/transducers comprise; piezoelectric crystals, piezoelectric ceramics, analog or digital pressure, vibration monitoring sensors, fluid pulse transducers/sensors, temperature, and strain transducers/sensors, radio frequency sensors, geophone, hydrophone, moisture sensors, electrochemical sensors, graphene sensors, nano material sensing systems, optical sensors , Wireless Identification and Sensing Platform sensors, amplifiers and integrated circuit technologies and conductivity, or inductivity sensing systems.

5. The system of claim 1 installed in a host pipeline wherein connectivity is provided by metallic or non-metallic wires installed in the reinforcement layer or the protective covering of the composite pipe structure or are separately installed within the core pipe wall to provide connectivity.

6. The system of claim 1 wherein a power source is provided by proximity to a metallic host pipe having electrical properties resultant from an operating Cathodic Protection system for a metallic host pipe.

7. The system of claim 1 wherein sensor/transducers with modified frequency identifiers provide the identity and location of the sensor/transducer embedded in the reinforcement layer or the protective covering of the composite pipe structure and separate sensors/transducers measure and record data comprising pressure, humidity, temperature, strain (bi-axial), fluid or gas composition, temperature, dimension, circumferential measurement, ovality or flow rate.

8. The system of claim 1 wherein the sensor/transducers and reader/activator units are tuned to operate in equivalent operating frequency ranges or by other contactless, near field communication.

9. The system of claim 1 wherein the reader/activator unit is configured to pass through the composite pipe structure, driven by flow in the composite pipe structure or pulled through the composite pipe structure by tether, and wherein the reader/activator unit further comprises a power source and activates and powers sensor/transducers and receives a resulting data transmission from a sensor/transducer storing the data received in a memory-storage area with the capability to wirelessly or cable transfer the stored data to a data storage and manipulation computer based system.

10. The reader/activator unit of claim 9 wherein the power source comprises a battery, battery pack, proximity to the host pipe with operating Cathodic Protection system, generator, invertor, or micro-nuclear power plant.

11. The reader/activator unit of claim 9 wherein the unit has an antenna tuned to a radio frequency identifier frequency in the same frequency range as the operating frequency of the sensor/transducers, or other contactless, wireless, near field communication with the sensor.

12. The system of claim 11 wherein the reader/activator unit is configured as a hand held or vehicle mounted to pass over a composite pipe structure, and wherein the reader/activator unit comprises a power source and activates and powers sensor/transducers and receives a resulting transmission from the sensor/transducers and storing the data received in a memory-storage area with the capability to wirelessly or cable transfer the data received in a memory-storage area to a data storage and manipulation computer based system.

13. The reader/activator unit of claim 12 wherein the vehicle is manually moved.

14. The reader/activator unit of claim 12 wherein power to pass the vehicle over a composite pipe is provided from a list comprising: a hovercraft, water craft, two or more wheeled vehicle, a tracked vehicle, a rotary aircraft or a fixed wing aircraft, or satellite.

15. The reader/activator unit of claim 12 wherein a database/storage/analytical computer based system is mounted on the vehicle and connected to the reader/activator unit.

16. The system of claim 1 wherein the database/storage/analytical computer based system comprises hardware and software that contains interpretation programs to compile, analyze and compare recorded data, furnish results to an operators and/or a pipeline supervisory control and data acquisition system, react upon results, inform from results, substitute and correlate results, offer readings for an operators action, and provide history of the pipeline over the life of the composite pipe structure all as part of the machine-learning aspect of the system, which will access and interface with the sensors and launcher/receiver apparatus.

17. The database/storage/analytical computer based system of claim 16 further comprising a wireless input/output port for communications with other systems.

18. The database/storage/analytical computer based system of claim 16 comprising analytical software for analysis of composite pipes including the use of a material properties database for strips, wires, fibers, fabrics and polymers.

19. The inline inspection system of claim 1 wherein the inline launch and recovery system contains a wired or wireless charging system, wired, wireless and/or fiber optic system for downloading and transmitting data from the reader/activator unit, and further comprises a fill chamber, a launch chamber, a receiving chamber and a recovery chamber, all with valves for launch and recovery of the reader/activator unit.

20. The inline inspection system of claim 1 wherein the reader/activator unit is a pig, a pod, a ball, a squid or a self propelled crawler.

* * * * *